United States Patent
Shen et al.

(10) Patent No.: US 12,235,571 B2
(45) Date of Patent: Feb. 25, 2025

(54) OPTICAL ELEMENT DRIVING MECHANISM

(71) Applicant: TDK TAIWAN CORP., Taoyuan (TW)

(72) Inventors: Wei-Jhe Shen, Taoyuan (TW); Yi-Ho Chen, Taoyuan (TW); Kai-Po Fan, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 554 days.

(21) Appl. No.: 17/570,805

(22) Filed: Jan. 7, 2022

(65) Prior Publication Data

US 2022/0221680 A1    Jul. 14, 2022

Related U.S. Application Data

(60) Provisional application No. 63/183,395, filed on May 3, 2021, provisional application No. 63/143,344, filed on Jan. 29, 2021, provisional application No. 63/135,402, filed on Jan. 8, 2021.

(51) Int. Cl.
| | |
|---|---|
| *G02B 7/02* | (2021.01) |
| *G02B 7/08* | (2021.01) |
| *G03B 5/02* | (2021.01) |
| *G11B 7/09* | (2006.01) |
| *H01F 7/08* | (2006.01) |
| *G02B 13/00* | (2006.01) |

(52) U.S. Cl.
CPC ............... *G03B 5/02* (2013.01); *G02B 7/02* (2013.01); *G02B 7/08* (2013.01); *G11B 7/0925* (2013.01); *G11B 7/093* (2013.01); *H01F 7/081* (2013.01); *G02B 13/001* (2013.01); *G03B 2205/0069* (2013.01)

(58) Field of Classification Search
CPC .......... G02B 7/08; G02B 7/02; G02B 13/001; G02B 7/10; G03B 5/02; G03B 2205/0069; G03B 30/00; G03B 13/34; H01F 7/081; H01F 7/0289; H01F 7/066
See application file for complete search history.

(56) References Cited

U.S. PATENT DOCUMENTS

| | | | | |
|---|---|---|---|---|
| 11,526,021 B2* | 12/2022 | Lai | .................. | H04N 23/687 |
| 2006/0146170 A1* | 7/2006 | Saito | .................. | H04N 23/57 |
| | | | | 348/340 |
| 2013/0170039 A1* | 7/2013 | Miyoshi | .................. | G02B 27/646 |
| | | | | 359/554 |
| 2016/0291284 A1* | 10/2016 | Watanabe | .................. | H04N 23/55 |
| 2016/0330375 A1* | 11/2016 | Sekimoto | .................. | H04N 23/55 |
| 2020/0007768 A1* | 1/2020 | Ohtsuka | .................. | H04N 23/663 |
| 2021/0208418 A1* | 7/2021 | Liu | .................. | H04N 23/687 |
| 2021/0227141 A1* | 7/2021 | Seo | .................. | G02B 13/0015 |
| 2022/0278150 A1* | 9/2022 | Luan | .................. | H04N 23/54 |
| 2022/0278151 A1* | 9/2022 | Luan | .................. | H01L 24/81 |

\* cited by examiner

*Primary Examiner* — Wyatt A Stoffa
*Assistant Examiner* — John Curtis Sipes
(74) *Attorney, Agent, or Firm* — Muncy, Geissler, Olds & Lowe, P.C.

(57) ABSTRACT

To solve the problems of the prior art, an optical element driving mechanism is provided. The optical element driving mechanism includes a fixed part, a movable part, and a driving assembly. The movable part is movable relative to the fixed part. The driving assembly drives the movable part to move relative to the fixed part.

17 Claims, 11 Drawing Sheets

OPTICAL ELEMENT DRIVING MECHANISM

CROSS REFERENCE TO RELATED APPLICATIONS

This application claims the benefit of U.S. Provisional Application No. 63/135,402, filed 8 Jan. 2021, U.S. Provisional Application No. 63/143,344, filed 29 Jan. 2021, and U.S. Provisional Application No. 63/183,395, filed 3 May 2021, the entirety of which are incorporated by reference herein.

BACKGROUND OF THE INVENTION

Field of the Invention

The present disclosure relates to an optical element driving mechanism, and more particularly to the optical element driving mechanism of an electrical device.

Description of the Related Art

As the relevant technologies have developed, many electronic devices (such as computers and tablets) are equipped with the capability to record images and videos. However, when an optical element (such as lens) having a long focal length is provided in an electronic device, the thickness of the electronic device may be increased, impeding the prospects for miniaturization of the electronic device. Therefore, how to design an optical element driving mechanism and an optical device that help to miniaturize the electronic device has become an important issue.

BRIEF SUMMARY OF THE INVENTION

To solve the problems of the prior art, an optical element driving mechanism is provided, including: a fixed part, a movable part, and a driving assembly. The movable part is movable relative to the fixed part. The driving assembly drives the movable part to move relative to the fixed part.

In one of the embodiments of the present disclosure, the driving assembly center of the driving assembly does not overlap the optical element driving mechanism center of the optical element driving mechanism when viewed along an optical axis.

In one of the embodiments of the present disclosure, the movable part holds an optical element. An optical element center of the optical element does not overlap an optical element driving mechanism center of the optical element driving mechanism when viewed along an optical axis.

In one of the embodiments of the present disclosure, the movable part includes a photosensitive element holder, and the photosensitive element holder includes a photosensitive element holder metal sheet. The driving assembly includes a driving magnetic element. The photosensitive element holder metal sheet at least partially overlaps the driving magnetic element when viewed along an optical axis.

In one of the embodiments of the present disclosure, the photosensitive element holder metal sheet does not completely overlap the whole driving magnetic element when viewed along the optical axis.

In one of the embodiments of the present disclosure, there is a non-zero gap between the photosensitive element holder metal sheet and the driving magnetic element.

In one of the embodiments of the present disclosure, the driving assembly further includes a driving coil, and the driving coil is disposed between the driving magnetic element and the photosensitive element holder metal sheet.

In one of the embodiments of the present disclosure, there is a non-zero gap between the photosensitive element holder metal sheet and the driving coil.

In one of the embodiments of the present disclosure, the optical element driving mechanism further includes a circuit assembly, and the circuit assembly includes a photosensitive element holder circuit board. The photosensitive element holder circuit board is disposed between the driving coil and the photosensitive element holder metal sheet.

In one of the embodiments of the present disclosure, the photosensitive element holder circuit board is in contact with the photosensitive element holder metal sheet.

In one of the embodiments of the present disclosure, the fixed part includes a frame, and the movable part includes a photosensitive element holder rolling element. The photosensitive element holder rolling element is disposed between the frame and the photosensitive element holder.

In one of the embodiments of the present disclosure, the photosensitive element holder includes a photosensitive element holder rolling element accommodating portion. The photosensitive element holder rolling element accommodating portion surrounds the photosensitive element holder rolling element. The photosensitive element holder metal sheet at least partially overlaps the photosensitive element holder rolling element accommodating portion when viewed along a direction that is perpendicular to the optical axis.

In one of the embodiments of the present disclosure, the frame includes a photosensitive element holder rolling element accommodating portion. The photosensitive element holder rolling element accommodating portion surrounds the photosensitive element holder rolling element.

In one of the embodiments of the present disclosure, the frame includes a frame metal sheet. The photosensitive element holder rolling element is disposed between the frame metal sheet and the photosensitive element holder metal sheet.

In one of the embodiments of the present disclosure, the photosensitive element holder rolling element is in contact with the frame metal sheet and the photosensitive element holder metal sheet.

In one of the embodiments of the present disclosure, the optical element driving mechanism further includes an elastic assembly. The elastic assembly includes a lower elastic element, and the lower elastic element is disposed under the frame metal sheet.

In one of the embodiments of the present disclosure, the lower elastic element is in contact with the frame metal sheet, and the photosensitive element holder rolling element does not have a metal material.

In one of the embodiments of the present disclosure, the optical element driving mechanism further includes a circuit assembly, and the circuit assembly includes an optical element holder circuit board. An external current flows into the optical element driving mechanism from the optical element holder circuit board, and then flows into the frame metal sheet, the lower elastic element, and the driving assembly in sequence.

In one of the embodiments of the present disclosure, the optical element driving mechanism further includes an elastic assembly. The fixed part includes an outer frame and a frame, and the outer frame has a magnetic conductive material. The elastic element includes an upper elastic element, and the upper elastic element is disposed above the frame. The elastic assembly is disposed between the driving assembly and the outer frame.

In one of the embodiments of the present disclosure, the movable part includes an optical element holder and a photosensitive element holder, and the optical element holder includes an optical element holder body and an optical element holder stopping element. Along the optical axis OA, the shortest distance between the stopping element of the optical element holder stopping element and the frame is shorter than the shortest distance between the optical element holder body and the photosensitive element holder.

BRIEF DESCRIPTION OF THE DRAWINGS

The present invention may be more fully understood by reading the subsequent detailed description and examples with references made to the accompanying drawings, wherein.

DETAILED DESCRIPTION OF THE INVENTION

The making and using of optical element driving mechanisms of embodiments of the present disclosure are discussed in detail below. It should be appreciated, however, that the embodiments provide many applicable inventive concepts that may be embodied in a wide variety of specific contexts. The specific embodiments discussed are merely illustrative of specific ways to make and use the embodiments and do not limit the scope of the disclosure.

It should be understood that, although the terms "first", "second" etc. may be used herein to describe various elements, layers and/or portions, and these elements, layers, and/or portions should not be limited by these terms. These terms are only used to distinguish one element, layer, or portion. Thus, a first element, layer or portion discussed below could be termed a second element, layer or portion without departing from the teachings of some embodiments of the present disclosure. In addition, for the sake of brevity, terms such as "first" and "second" may not be used in the description to distinguish different elements. As long as it does not depart from the scope defined by the appended claims, the first element and/or the second element described in the appended claims can be interpreted as any element that meets the description in the specification.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
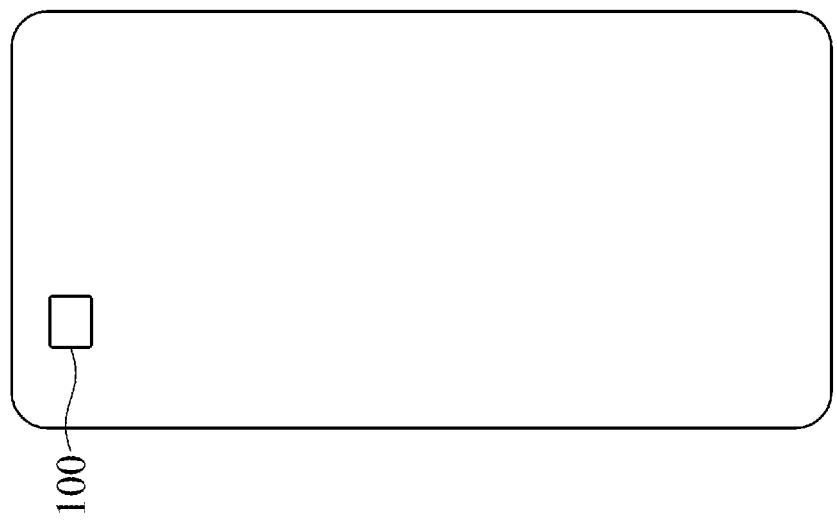
FIG. 1 is a schematic view of an electrical device according to some embodiment of the present disclosure.

Firstly, please refer to FIG. 1, FIG. 1 is a schematic view of an electrical device 1 according to some embodiment of the present disclosure. As shown in FIG. 1, an optical element driving mechanism 100 of some embodiment of the present disclosure may be mounted in an electrical device 1 for taking photos or videos, wherein the aforementioned electrical device 1 may, for example, be a smartphone or a digital camera, but the present disclosure is not limited to these. It should be noted that the position and the size between the optical element driving mechanism 100 and the electrical device 1 shown in FIG. 1 are only an example, which is not for limiting the position and the size between the optical element driving mechanism 100 and the electrical device 1. In fact, according to different needs, the optical element driving mechanism 100 may be mounted at different positions in the electrical device 1

Figure 2:
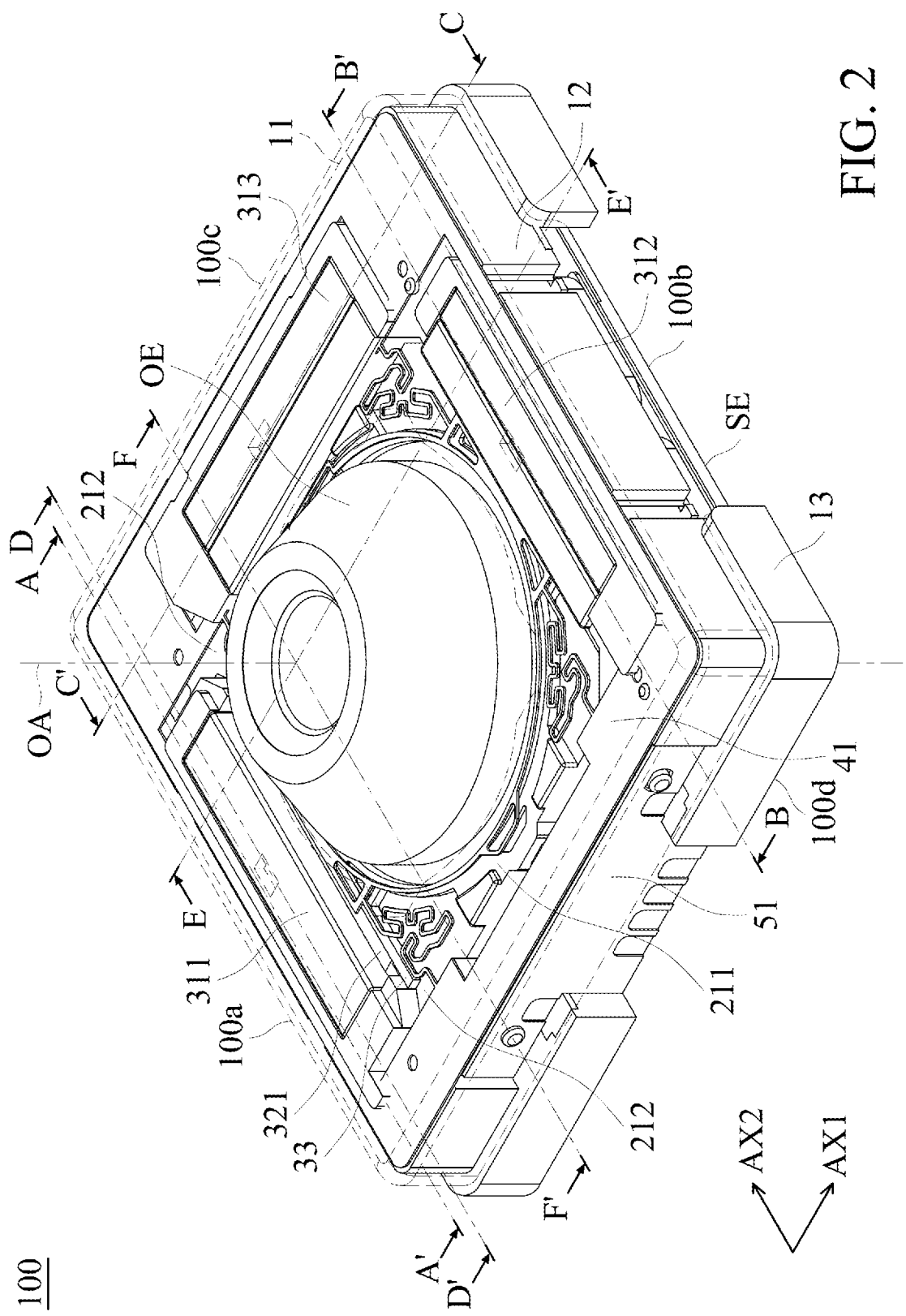
FIG. 2 is a schematic view of an optical element driving mechanism according to some embodiments of the present disclosure, wherein an outer frame is shown as a dashed line.
Figure 3:
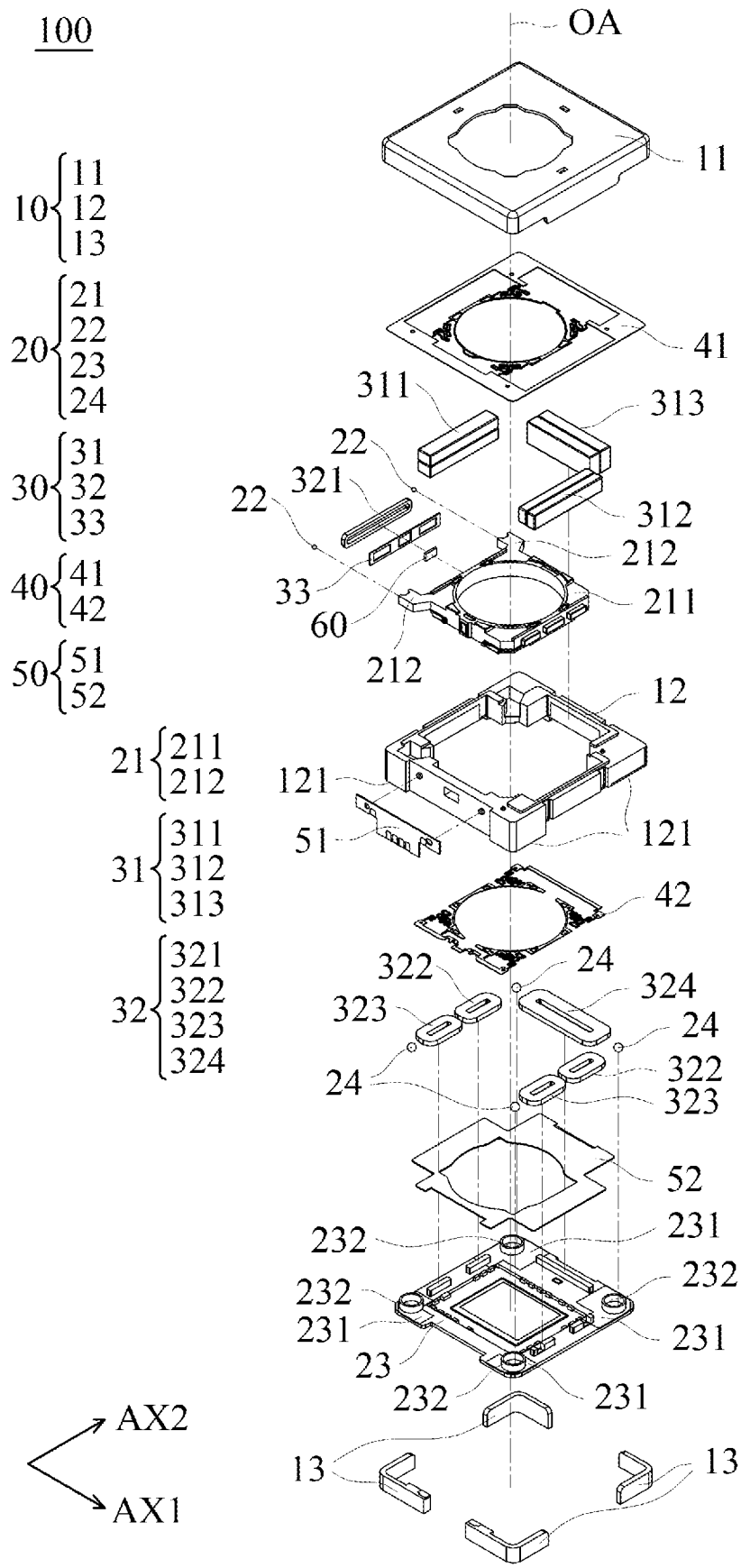
FIG. 3 is an exploded view of the optical element driving mechanism according to some embodiments of the present disclosure.

Please refer to FIG. 2. FIG. 2 is a schematic view of the optical element driving mechanism 100 according to some embodiments of the present disclosure, wherein the outer frame is shown as a dashed line. FIG. 3 is an exploded view of the optical element driving mechanism 100 according to some embodiments of the present disclosure.

As shown in FIG. 2 and FIG. 3, the optical element driving mechanism 100 may include a fixed part 10, a movable part 20, a driving assembly 30, an elastic assembly 40, a circuit assembly 50, and a sensing element 60.

The optical element driving mechanism 100 may have a first side 100a, a second side 100b, a third side 100c, and a fourth side 100d. According to some embodiments of the present disclosure, the first side 100a is opposite to the second side 100b, and the first side 100a and the second side 100b are parallel to each other. According to some embodiments of the present disclosure, the third side 100c is opposite to the fourth side 100d, and the third side 100c and the fourth side 100d are parallel to each other.

The movable part 20 may move relative to the fixed part 10, and the driving assembly 30 may drive the movable part 20 to move relative to the fixed part 10. The movable part 20 may holds an optical element OE.

The fixed part 10 may include an outer frame 11, a frame 12, and a base 13. The outer frame 11 may be disposed on the base 13 to form an internal space, so as to accommodate the elements of the optical element driving mechanism 100.

The movable part 20 may include an optical element holder 21, an optical element holder guiding element 22, a photosensitive element holder 23, and a photosensitive element holder rolling element 24.

The driving assembly 30 may include a driving magnetic element 31, a driving coil 32, and a first driving magnetic element conductive sheet 33.

According to some embodiments of the present disclosure, the elastic assembly 40 may be disposed between the driving assembly 30 and the outer frame 11. The elastic assembly 40 may include an upper elastic element 41 and a lower elastic element 42.

The circuit assembly 50 may include an optical element holder circuit board 51 and a photosensitive element holder circuit board 52. According to some embodiments of the present disclosure, the optical element holder circuit board 51 may be disposed on the fourth side 100d of the optical element driving mechanism 100.

According to some embodiments of the present disclosure, the outer frame 11 may have a magnetic conductive material to enhance and concentrate the magnetic force of the driving magnetic element 31. According to some embodiments of the present disclosure, the frame 12 may include a frame metal sheet 121.

The optical element holder 21 may include an optical element holder body 211 and an optical element holder stopping element 212. The optical element holder 21 may fixedly hold the optical element OE. Therefore, the optical element OE will move with the optical element holder 21 when the optical element holder 21 is moving.

As shown in the figures, the optical element holder stopping element 212 may extend from the optical element holder body 211 toward the frame 12.

According to some embodiments of the present disclosure, the optical element holder guiding element 22 may be disposed on the first side 100a of the optical element driving mechanism 100. The optical element holder guiding element 22 may guide the optical element holder 21 so that the optical element holder 21 may move in a desired dimension (for example, along an optical axis OA).

As shown in the figure, according to some embodiments of the present disclosure, the optical element holder guiding element 22s may have a spherical shape to facilitate the stable movement of the optical element holder 21 along the optical axis OA.

The photosensitive element holder 23 may fixedly hold a photosensitive element SE. According to some embodiments of the present disclosure, the photosensitive element holder 23 may move along a first axis AX1 and a second axis AX2 that are perpendicular to the optical axis OA. According to some embodiments of the present disclosure, the photosensitive element holder 23 may move (rotate) around the optical axis OA.

The photosensitive element holder 23 may include a photosensitive element holder metal sheet 231 and a photosensitive element holder rolling element accommodating portion 232.

According to some embodiments of the present disclosure, the driving magnetic element 31 may correspond to the driving coil 32. The driving magnetic element 31 may include a first driving magnetic element 311, a second driving magnetic element 312, and a third driving magnetic element 313.

The driving coil 32 includes an optical element holder driving coil 321, a photosensitive element holder first driving coil 322, a photosensitive element holder second driving coil 323, and a photosensitive element holder third driving coil 324.

Figure 5:
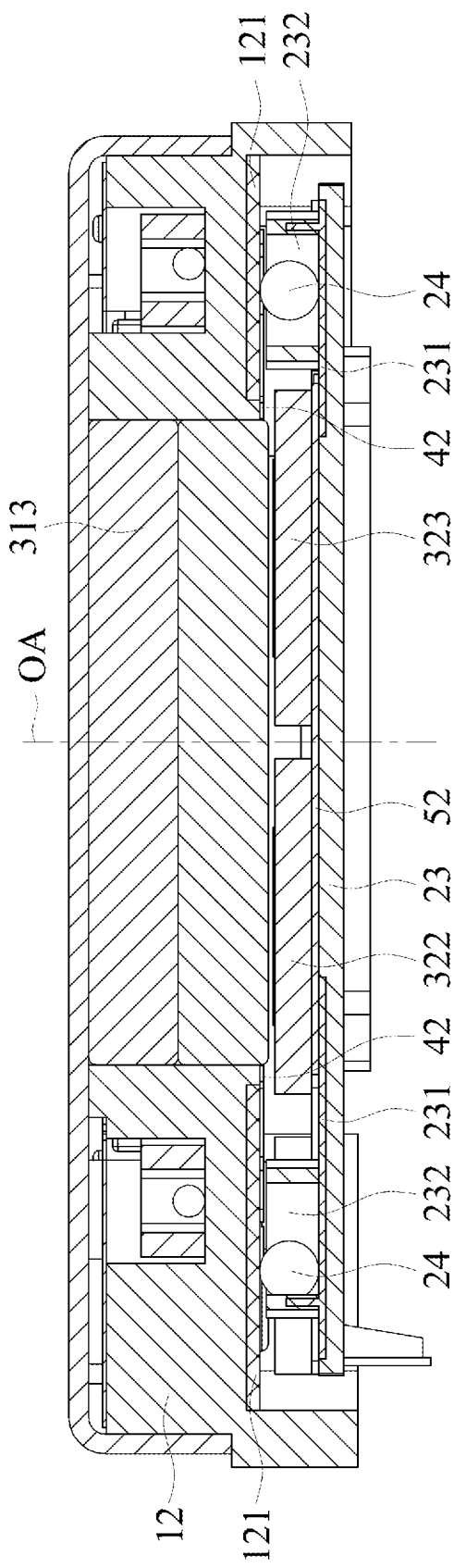
FIG. 5 is a cross-sectional view of the optical element driving mechanism along line A-A' of FIG. 2, according to some embodiments of the present disclosure.

According to some embodiments of the present disclosure, the upper elastic element 41 may be disposed above the frame 12, and the lower elastic element 42 is disposed under the frame metal sheet 121 (FIG. 5).

Figure 4:
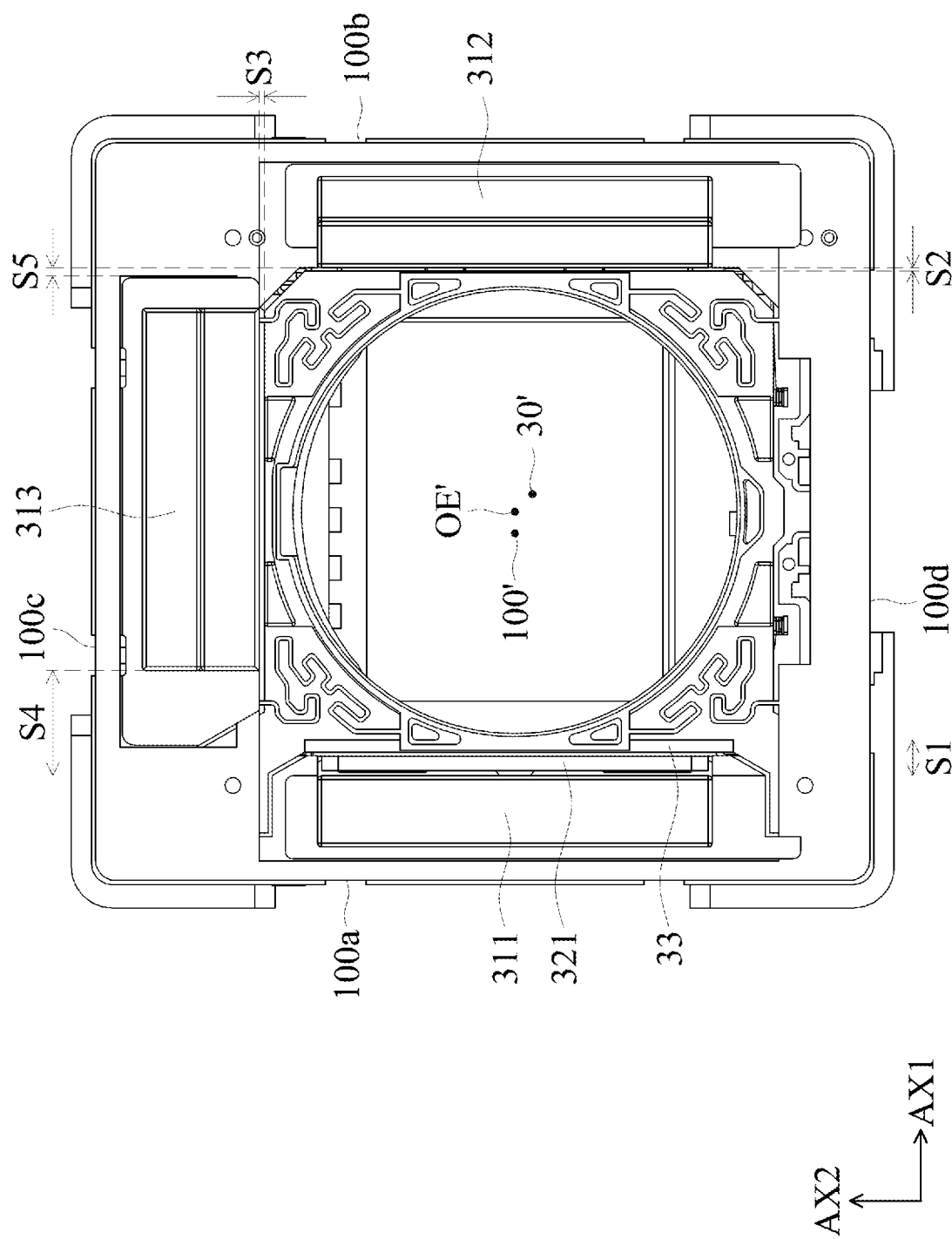
FIG. 4 is a schematic view of the optical element driving mechanism according to some embodiments of the present disclosure, wherein the outer frame is omitted.

Please refer to FIG. 4. FIG. 4 is a schematic view of the optical element driving mechanism 100 according to some embodiments of the present disclosure, wherein the outer frame is omitted. As shown in FIG. 4, according to some embodiments of the present disclosure, the first driving magnetic element 311 and the second driving magnetic element 312 may be respectively disposed on two opposite sides of the optical element driving mechanism 100. According to some embodiments of the present disclosure, the first driving magnetic element 311 and the second driving magnetic element 312 may be arranged along the first axis AX1.

According to some embodiments of the present disclosure, the first driving magnetic element 311 may be disposed on the first side 100a of the optical element driving mechanism 100. According to some embodiments of the present disclosure, the second driving magnetic element 312 may be disposed on the second side 100b of the optical element driving mechanism 100. According to some embodiments of the present disclosure, the third driving magnetic element 313 may be disposed on the third side 100c of the optical element driving mechanism 100. According to some embodiments of the present disclosure, the driving magnetic element 31 is not disposed on the fourth side 100d of the optical element driving mechanism 100

As shown in FIG. 4, according to some embodiments of the present disclosure, the optical element holder driving coil 321 may be disposed on the optical element holder 21, and the optical element holder driving coil 321 may correspond to the first driving magnetic element 311. In other words, the optical element holder driving coil 321 may be disposed on the first side 100a of the optical element driving mechanism 100, and the optical element holder driving coil 321 may be disposed adjacent to the first driving magnetic element 311.

According to some embodiments of the present disclosure, the first driving magnetic element conductive sheet 33 may be disposed between the optical element holder driving coil 321 and the optical element holder 21. According to some embodiments of the present disclosure, the optical element holder driving coil 321 may be fixedly disposed on first driving magnetic element conductive sheet 33.

In other words, according to some embodiments of the present disclosure, the first driving magnetic element conductive sheet 33 may correspond to the first magnetic driving element 311. In this way, the magnetic force of the first driving magnetic element 311 may be concentrated, and a stronger driving force may be used to move the optical element holder 21 along the optical axis OA.

Please refer to FIG. 4, according to some embodiments of the present disclosure, the driving coil 32 is not disposed between the second driving magnetic element 312 and the optical element holder 21. According to some embodiments of the present disclosure, the driving coil 32 is not disposed between the third driving magnetic element 313 and the optical element holder 21. In this way, the volume and weight of the optical element driving mechanism 100 may be reduced, and the effect of miniaturization may be achieved.

Please continue to refer to FIG. 4, according to some embodiments of the present disclosure, the shortest distance S1 between the first driving magnetic element 311 and the optical element holder 21 is greater than the shortest distance S2 between the second driving magnetic element 312 and the optical element holder 21 when viewed along the optical axis OA. It should be noted that, according to some embodiments of the present disclosure, the shortest distance S1 and the shortest distance S2 may be parallel to the first axis AX1.

According to some embodiments of the present disclosure, the shortest distance S1 between the first magnetic drive element 311 and the optical element holder 21 is greater than the shortest distance S3 between the third magnetic drive element 313 and the optical element holder 21 when viewed along the optical axis OA. It should be noted that, according to some embodiments of the present disclosure, the shortest distance S3 may be parallel to the second axis AX2.

According to the disclosed embodiment, the shortest distance S4 between the third driving magnetic element 313 and the first driving magnetic element 311 is greater than the shortest distance S5 between the third driving magnetic element 313 and the second driving magnetic element 312 when viewed along the optical axis OA.

It should be noted that, according to some embodiments of the present disclosure, the aforementioned shortest distance S4 and shortest distance S5 may be parallel to the first axis AX1.

That is, as shown in FIG. 4, according to some embodiments of the present disclosure, the optical element holder 21 and the optical element OE (not shown in FIG. 4) may be eccentric. Moreover, according to some embodiments of the present disclosure, the driving assembly 30 may be eccentric.

According to some embodiments of the present disclosure, the driving assembly center 30' of the driving assembly 30 may not overlap the optical element driving mechanism center 100' of the optical element driving mechanism 100 when viewed along the optical axis OA.

According to some embodiments of the present disclosure, an optical element center OE' of the optical element OE may not overlap the optical element driving mechanism center 100' of the optical element driving mechanism 100 when viewed along the optical axis OA.

According to some embodiments of the present disclosure, the optical element center OE' of the optical element OE may not overlap the driving assembly center 30' of the driving assembly 30 when viewed along the optical axis OA.

However, according to some other embodiments of the present disclosure, the optical element center OE' of the optical element OE may overlap the driving assembly center 30' of the driving assembly 30 when viewed along the optical axis OA (not shown in the figures).

Figure 6:
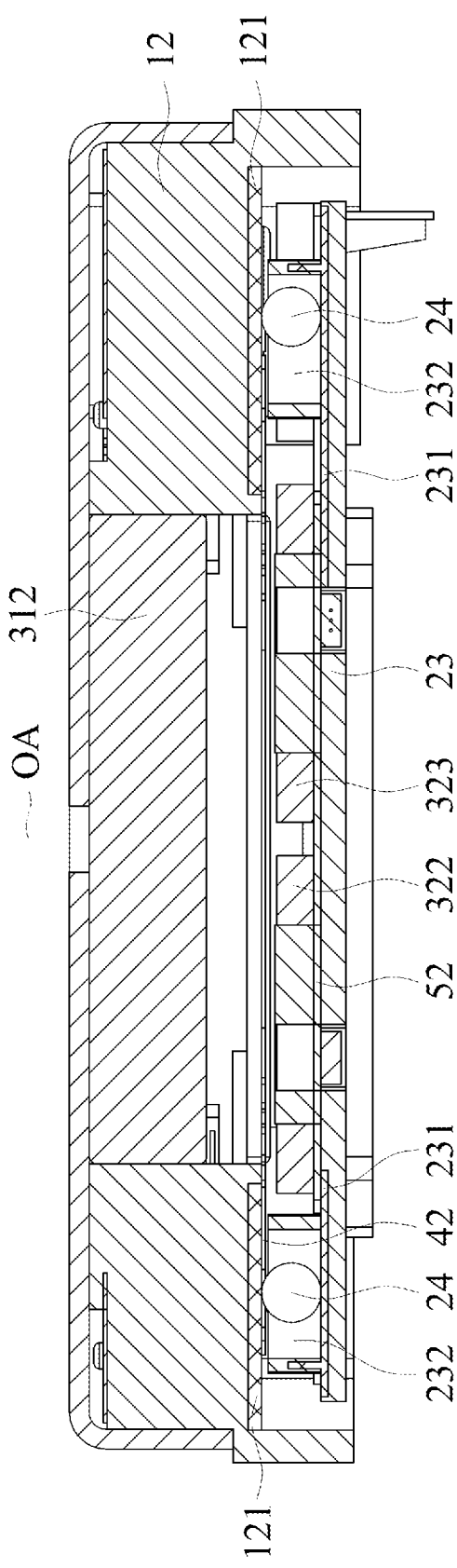
FIG. 6 is a cross-sectional view of the optical element driving mechanism along line B-B' of FIG. 2, according to some embodiments of the present disclosure.

Please refer to FIG. 5 and FIG. 6, FIG. 5 is a cross-sectional view of the optical element driving mechanism 100 along line A-A' of FIG. 2, according to some embodiments of the present disclosure; FIG. 6 is a cross-sectional view of the optical element driving mechanism 100 along line B-B' of FIG. 2, according to some embodiments of the present disclosure.

As shown in FIG. 5 and FIG. 6, according to some embodiments of the present disclosure, the photosensitive element holder first driving coil 322 and the photosensitive element holder second driving coil 323 may be disposed on the photosensitive element holder 23.

As shown in FIG. 5, according to some embodiments of the present disclosure, the photosensitive element holder first driving coil 322 and the photosensitive element holder second driving coil 323 may correspond to the first driving magnetic element 311.

According to some embodiments of the present disclosure, the photosensitive element holder first driving coil 322 and the photosensitive element holder second driving coil 323 of the driving coil 32 may be disposed between the first driving magnetic element 311 of the driving magnetic 31 and the photosensitive element holder 23.

As shown in FIG. 6, according to some embodiments of the present disclosure, the photosensitive element holder first driving coil 322 and the photosensitive element holder second driving coil 323 may correspond to the second magnetic driving element 312.

the photosensitive element holder first driving coil 322 and the photosensitive element holder second driving coil 323 of the driving coil 32 may be disposed between the second magnetic driving element 312 of the driving magnetic 31 and the photosensitive element holder 23

Figure 7:
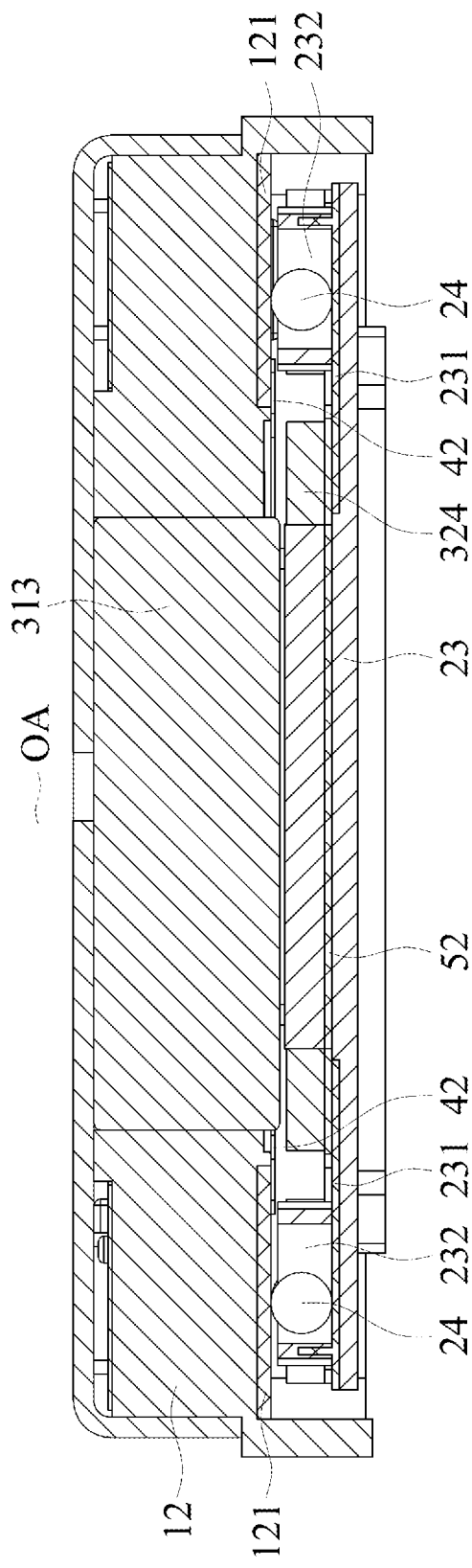
FIG. 7 is a cross-sectional view of the optical element driving mechanism along line C-C' of FIG. 2.

Please refer to FIG. 7, FIG. 7 is a cross-sectional view of the optical element driving mechanism 100 along line C-C' of FIG. 2. As shown in FIG. 7, according to some embodiments of the present disclosure, the photosensitive element holder third driving coil 324 may be disposed on the photosensitive element holder 23.

According to some embodiments of the present disclosure, the photosensitive element holder third driving coil 324 may correspond to the third driving magnetic element 313. According to some embodiments of the present disclosure, the photosensitive element holder third driving coil 324 of the driving coil 32 may be disposed between the third driving magnetic element 313 of the driving magnetic element 31 and the photosensitive element holder 23.

Please refer to FIG. 5, according to some embodiments of the present disclosure, the photosensitive element holder metal sheet 231 may at least partially overlap the first driving magnetic element 311 of the driving magnetic element 31 when viewed along the optical axis OA.

According to some embodiments of the present disclosure, the photosensitive element holder metal sheet 231 may not completely overlap the whole first driving magnetic element 311 of the driving magnetic element 31 when viewed along the optical axis OA.

Please refer to FIG. 6, according to some embodiments of the present disclosure, the photosensitive element holder metal sheet 231 and the second driving magnetic element 312 of the driving magnetic element 31 may at least partially overlap when viewed along the optical axis OA.

According to some embodiments of the present disclosure, the photosensitive element holder metal sheet 231 may not completely overlap the whole second driving magnetic elements 312 of the driving magnetic elements 31 when viewed along the optical axis OA.

Please refer to FIG. 7, according to some embodiments of the present disclosure, the photosensitive element holder metal sheet 231 may at least partially overlap the third driving magnetic element 313 of the driving magnetic element 31 when viewed along the optical axis OA.

According to some embodiments of the present disclosure, the photosensitive element holder metal sheet 231 may not completely overlap the whole third driving magnetic element 313 of the driving magnetic elements 31 when viewed along the optical axis OA.

That is, according to some embodiments of the present disclosure, the photosensitive element holder metal sheet 231 may not completely overlap the whole driving magnetic element 31 when viewed along the optical axis OA.

The above configuration may make the photosensitive element holder 23 move back to the original position by magnetic force when the driving coil 32 of the driving assembly 30 does not receive current. It should be noted that the original position herein may refer to the natural resting position of the photosensitive element holder 23 when it is not subjected to electromagnetic driving force.

Please refer to FIG. 5, according to some embodiments of the present disclosure, there may be a non-zero gap between the photosensitive element holder metal sheet 231 and the first driving magnetic element 311 of the driving magnetic element 31.

Please refer to FIG. 6, according to some embodiments of the present disclosure, there may be a non-zero gap between the photosensitive element holder metal sheet 231 and the second driving magnetic element 312 of the driving magnetic element 31.

Please refer to FIG. 7, according to some embodiments of the present disclosure, there may be a non-zero gap between the photosensitive element holder metal sheet 231 and the third driving magnetic element 313 of the driving magnetic element 31.

In other words, according to some embodiments of the present disclosure, there may be a non-zero gap between the photosensitive element holder metal sheet 231 and the driving magnetic element 31.

Please refer to FIG. 5, according to some embodiments of the present disclosure, there may be a non-zero gap between the photosensitive element holder metal sheet 231 and the photosensitive element holder first driving coil 322 and the photosensitive element holder second driving coil 323 of the driving coil 32.

Please refer to FIG. 6, according to some embodiments of the present disclosure, there may be a non-zero gap between the photosensitive element holder metal sheet 231 and the photosensitive element holder first driving coil 322 and the photosensitive element holder second driving coil 323 of the driving coil 32.

Please refer to FIG. 7, according to some embodiments of the present disclosure, there may be a non-zero gap between the photosensitive element holder metal sheet 231 and the photosensitive element holder third driving coil 324 of the driving coil 32.

That is, according to some embodiments of the present disclosure, there may be a non-zero gap between the photosensitive element holder metal sheet 231 and the driving coil 32.

Please refer to FIG. 5, according to some embodiments of the present disclosure, the photosensitive element holder first driving coil 322 and the photosensitive element holder second driving coil 323 of the driving coil 32 may be disposed between the first driving magnetic element 311 of the driving magnetic element 31 and the photosensitive element holder metal sheet 231.

Please refer to FIG. 6, according to some embodiments of the present disclosure, the photosensitive element holder first driving coil 322 and the photosensitive element holder second driving coil 323 of the driving coil 32 may be disposed between the second driving magnetic element 312 of the driving magnetic element 31 and the photosensitive element holder metal sheet 231.

Please refer to FIG. 7, according to some embodiments of the present disclosure, the photosensitive element holder third driving coil 324 of the driving coil 32 may be disposed between the third driving magnetic element 313 of the driving magnetic element 31 and the photosensitive element holder metal sheet 231.

In other words, according to some embodiments of the present disclosure, the driving coil 32 may be disposed between the driving magnetic element 31 and the photosensitive element holder metal sheet 231.

Figure 8:
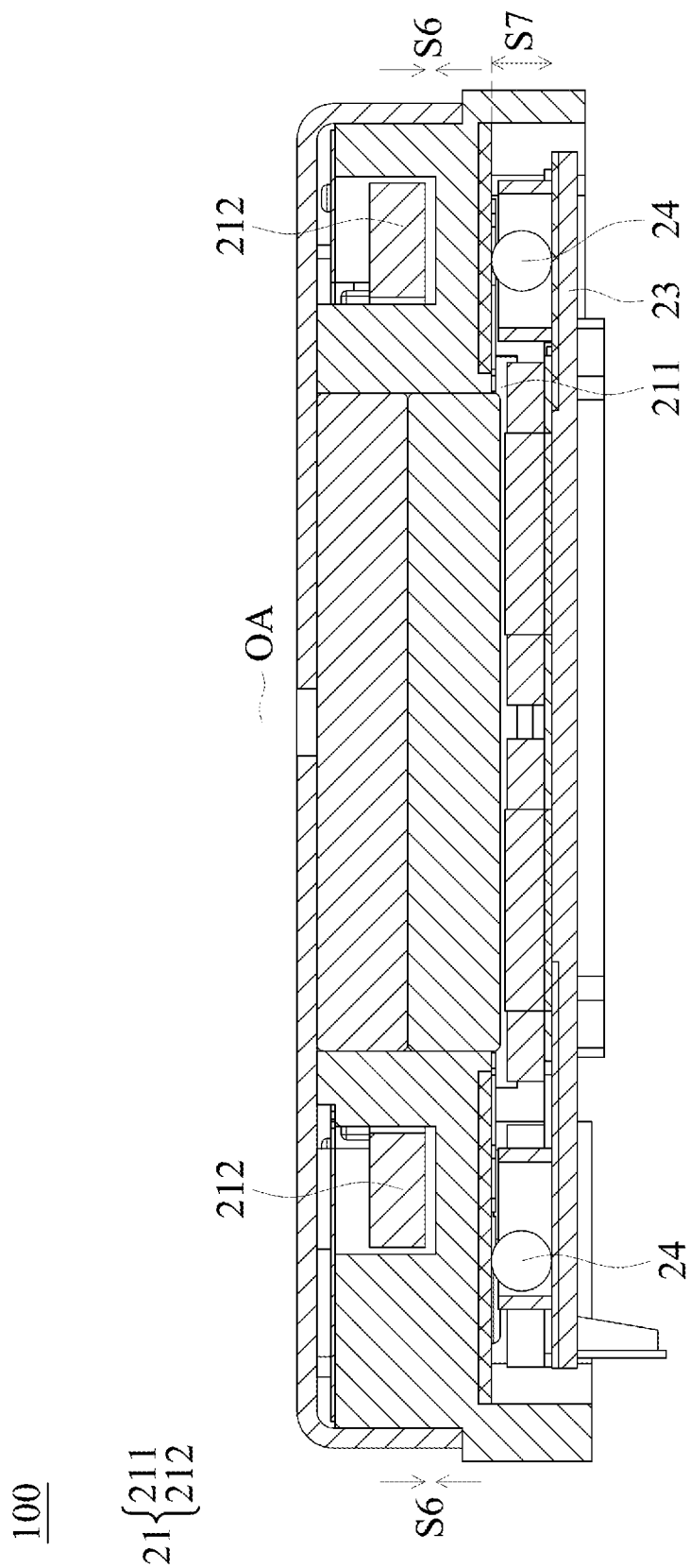
FIG. 8 is a cross-sectional view of the optical element driving mechanism along line D-D' of FIG. 2.

Please refer to FIG. 8, FIG. 8 is a cross-sectional view of the optical element driving mechanism 100 along line D-D' of FIG. 2. As shown in FIG. 8, In accordance with some embodiments of the present disclosure, along the optical axis OA, the shortest distance S6 between the optical element holder stopping element 212 and the frame 12 of the fixed part 10 may be shorter than the shortest distance S7 between the optical element holder body 211 and the photosensitive element holder 23.

In this way, the range of movement of the optical element holder 21 along the optical axis OA may be restricted, and the optical element holder 21 may be prevented from being in contact with the photosensitive element holder 23, thereby preventing the optical element holder 21 and the photosensitive element holder 23 from damage.

Please refer to FIG. 5, according to some embodiments of the present disclosure, the photosensitive element holder circuit board 52 may be disposed between the photosensitive element holder first driving coil 322 and the photosensitive element holder second driving coil 323 of the driving coil 32 and the photosensitive element holder metal sheet 231.

Please refer to FIG. 6, according to some embodiments of the present disclosure, the photosensitive element holder circuit board 52 may be disposed between the photosensitive element holder first driving coil 322 and the photosensitive element holder second driving coil 323 of the driving coil 32 and the photosensitive element holder metal sheet 231.

Please refer to FIG. 7, according to some embodiments of the present disclosure, the photosensitive element holder circuit board 52 may be disposed between the photosensitive element holder third driving coil 324 of the driving coil 32 and the photosensitive element holder metal sheet 231.

In other words, according to some embodiments of the present disclosure, the photosensitive element holder circuit board 52 may be disposed between the driving coil 32 and the photosensitive element holder metal sheet 231.

Please refer to FIG. 5, FIG. 6 and FIG. 7, according to some embodiments of the present disclosure, the photosensitive element holder circuit board 52 may be in contact with the photosensitive element holder metal sheet 231.

Please refer to FIG. 5, FIG. 6 and FIG. 7, according to some embodiments of the present disclosure, the photosensitive element holder rolling element 24 may be disposed between the frame 12 and the photosensitive element holder 23.

In this way, the photosensitive element holder 23 may move relative to the frame 12 of the fixed part 10. For example, the photosensitive element holder 23 may move relative to the frame 12 of the fixed part 10 along the first axis AX1 or the second axis AX2. For example, the photosensitive element holder 23 may move (rotate) relative to the frame 12 of the fixed part 10 around the optical axis OA.

Please refer to FIG. 5, FIG. 6 and FIG. 7, according to some embodiments of the present disclosure, the photosensitive element holder rolling element 24 may be disposed between the frame metal sheet 121 and the photosensitive element holder metal sheet 231.

Please refer to FIG. 5, FIG. 6 and FIG. 7, according to some embodiments of the present disclosure, the photosensitive element holder rolling element 24 may be in contact with the frame metal sheet 121 and the photosensitive element holder metal sheet 231. In this way, the frame 12 and the photosensitive element holder 23 may be avoided from being damaged, and it may be helpful for the movement of the photosensitive element holder rolling element 24.

Please refer to FIG. 5, FIG. 6 and FIG. 7, according to some embodiments of the present disclosure, the photosensitive element holder rolling element accommodating portion 232 may surround the photosensitive element holder rolling element 24. In this way, the range of movement of the photosensitive element holder rolling element 24 may be limited.

Please refer to FIG. 5, FIG. 6 and FIG. 7, according to some embodiments of the present disclosure, the photosensitive element holder metal sheet 231 may at least partially overlap the photosensitive element holder rolling element accommodating portion 232 when viewed along a direction that is perpendicular to the optical axis OA (for example, the first axis AX1 or the second axis AX2).

In other words, according to some embodiments of the present disclosure, the photosensitive element holder metal sheet 231 may extend along the optical axis OA. By doing so, the structure of the photosensitive element holder rolling element accommodating portion 232 may be strengthened, and the damage to the photosensitive element holder rolling element accommodating portion 232 may be avoided.

Please refer to FIG. 5, FIG. 6 and FIG. 7, according to some embodiments of the present disclosure, the lower elastic element 42 may be in contact with the frame metal sheet 121, and the photosensitive element holder rolling element 24 may not have a metal material.

According to some embodiments of the present disclosure, the lower elastic element 42 may have a metal material, so that the lower elastic element 42 may be electrically connected to the frame metal sheet 121.

In some embodiments where the photosensitive element holder rolling element 24 does not have a metal material, even if the photosensitive element holder rolling element 24 is in direct contact with the frame metal sheet 121 and the photosensitive element holder metal sheet 231, the frame metal sheet 121 and the photosensitive element holder metal sheet 231 is still not electrically connected through the photosensitive element holder rolling element 24. However, according to some embodiments of the present disclosure, the frame metal sheet 121 and the photosensitive element holder metal sheet 231 may be electrically connected to each other through other elements.

According to some embodiments of the present disclosure, an external current may flow into the optical element driving mechanism 100 from the optical element holder circuit board 51, and then flow into the frame metal sheet 121, the lower elastic element 42 and the optical element holder driving coil 321 of the driving coil 32 of the driving assembly 30 in sequence.

In this way, the optical element holder 21 and the optical element OE may be driven to move along the optical axis OA. Moreover, it may contribute to the connection of the driving coil 32 with external electric current.

According to some embodiments of the present disclosure, an external current may flow into the optical element driving mechanism 100 from the optical element holder circuit board 51, and then flow into the photosensitive element holder metal sheet 231 and the photosensitive element holder first driving coil 322, the photosensitive element holder second driving coil 323 and the photosensitive element holder third driving coil 324 of the driving assembly 30.

In this way, the photosensitive element holder 23 and the photosensitive element SE may be driven to move along the first axis AX1 or the second axis AX2. Alternatively, the photosensitive element holder 23 and the photosensitive element SE may be driven to move around the optical axis OA. Moreover, it may contribute to the connection of the driving coil 32 with external electric current.

According to some embodiments of the present disclosure, the optical element holder guiding element 22 may have a rod shape (not shown in the figures), and the optical element holder guiding element 22 may have a metal material. Moreover, an external current may flow into the optical element driving mechanism 100 from the optical element holder circuit board 51, and then flow into the optical element holder guiding element 22, and the optical element holder driving coil 321 of the driving coil 32 of the driving assembly 30 in sequence.

In this way, the optical element holder 21 and the optical element OE may be driven to move along the optical axis OA. Moreover, it may contribute to the connection of the driving coil 32 with external electric current.

In this embodiment (the optical element holder guiding element 22 may have a rod shape), the photosensitive element holder rolling element 24 may have a metal material without affecting the current flow inside the optical element driving mechanism 100.

According to some embodiments of the present disclosure, the optical element holder circuit board 51 may be attached to the optical element holder 21 (not shown in the figures), so that an external current may flow directly from the optical element holder circuit board 51 to the optical element holder driving coil 321 of the driving coil 32 of the driving assembly 30.

In this embodiment (the optical element holder circuit board 51 is attached to the optical element holder 21), the photosensitive element holder rolling element 24 may have a metal material without affecting the current flow inside the optical element driving mechanism 100.

According to some embodiments of the present disclosure, the direction of the current of the photosensitive element holder first driving coil 322 and the direction of the current of the photosensitive element holder second driving coil 323 may be the same when viewed along the optical axis OA (for example, the directions of the currents are clockwise or the directions of the currents are counterclockwise when viewed along the optical axis OA).

In this way, when the photosensitive element holder first driving coil 322 and the photosensitive element holder second driving coil 323 receive the currents with the same direction ((for example, the directions of the currents are clockwise or the directions of the currents are counterclockwise when viewed along the optical axis OA), the photosensitive element holder 23 and the photosensitive element SE may be driven to move along the first axis AX1 (positively or negatively).

According to some embodiments of the present disclosure, the direction of the current of the photosensitive element holder first driving coil 322 and the direction of the current of the photosensitive element holder second driving coil 323 may be different when viewed along the optical axis OA (for example, the direction of one of the currents is clockwise while the direction of the other currents are counterclockwise when viewed along the optical axis OA).

In this way, when the photosensitive element holder first driving coil 322 and the photosensitive element holder second driving coil 323 receive the currents with different directions when viewed along the optical axis OA (for example, the direction of one of the currents is clockwise while the direction of the other currents are counterclockwise when viewed along the optical axis OA), the photosensitive element holder 23 and the photosensitive element SE may be driven to move (rotate) around the optical axis OA (clockwise or counterclockwise).

According to some embodiments of the present disclosure, the photosensitive element holder 23 and the photosensitive element SE may be driven to move along the second axis AX2 (positively or negatively) when the photosensitive element holder third driving coil 324 receives current.

Figure 9:
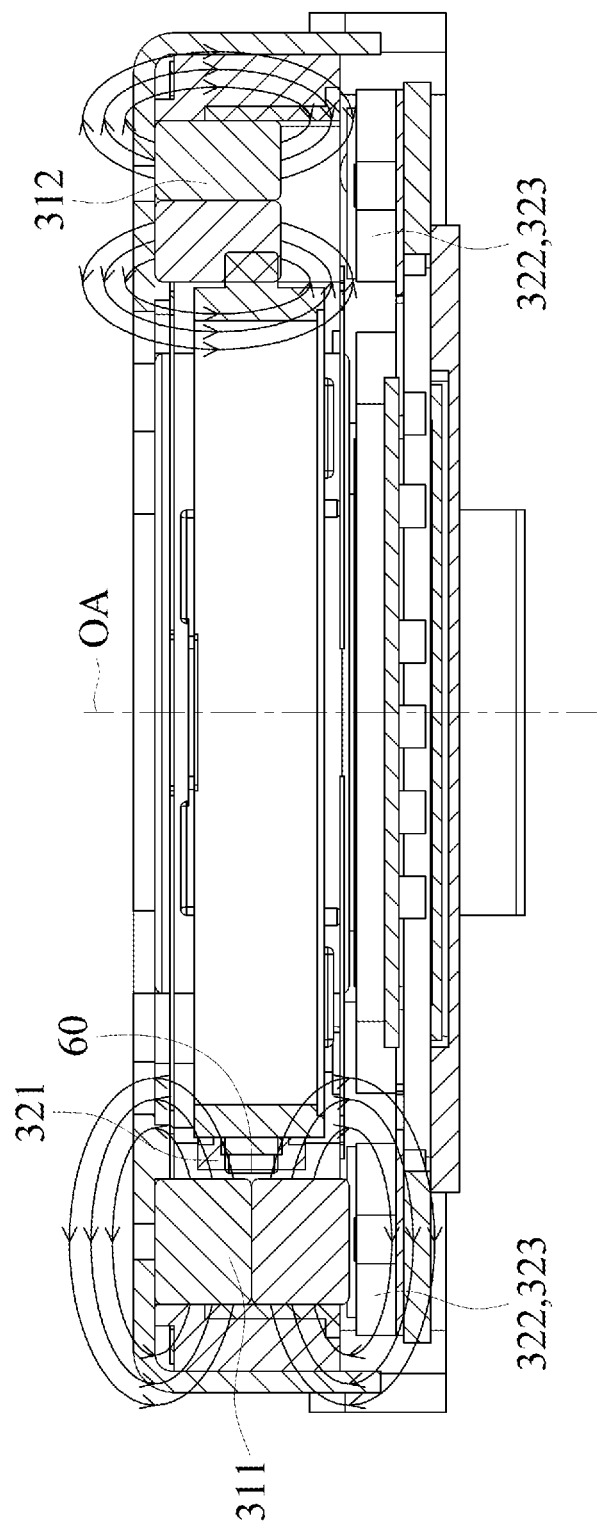
FIG. 9 is a cross-sectional view of the optical element driving mechanism along line E-E' of FIG. 2, wherein magnetic field lines of a first driving magnetic element and magnetic field lines of a second driving magnetic element are illustrated.

Please refer to FIG. 9, FIG. 9 is a cross-sectional view of the optical element driving mechanism 100 along line E-E' of FIG. 2, wherein the magnetic field lines of the first driving magnetic element 311 and the magnetic field lines of the second driving magnetic element 312 are illustrated.

It should be noted that, in FIG. 9, the lines with arrows represent magnetic field lines of the first driving magnetic element 311 or the second magnetic driving element 312, wherein the directions of the magnetic field lines shown in FIG. 9 (as indicated by arrows) is only an example, which is not for limiting the embodiments of the present disclosure.

As shown in FIG. 9, according to some embodiments of the present disclosure, the magnetic force emitting surface (perpendicular to the magnetic field lines) of the first driving magnetic element 311 may be parallel to the optical axis OA. For example, the magnetic force emitting surface of the first driving magnetic element 311 may be perpendicular to the first axis AX1.

In this way, the optical element holder driving coil 321 may receive more magnetic force of the first driving magnetic element 311, and a stronger driving force may be used to move the optical element holder 21 along the optical axis OA.

Please continue to refer to FIG. 9, the first driving magnetic element 311 may correspond to the optical element holder driving coil 321, the photosensitive element holder first driving coil 322 and the photosensitive element holder second driving coil 323 at the same time. In this way, the number of required elements may be reduced, and the effect of miniaturization may be achieved.

As shown in FIG. 9, according to some embodiments of the present disclosure, the sensing element 60 may be disposed on the optical element holder 21. Moreover, the sensing element 60 may correspond to the magnetic force emission surface of the first driving magnetic element 311. In this way, the sensing element 60 may receive more of the magnetic force of the first driving magnetic element 311, and thus it may sense the position of the optical element holder 21 more accurately.

Please refer to FIG. 9, according to some embodiments of the present disclosure, the magnetic force emitting surface (perpendicular to the magnetic field lines) of the second driving magnetic element 312 may be perpendicular to the optical axis OA. In this way, the photosensitive element holder first driving coil 322 and the photosensitive element holder second driving coil 323 may receive more magnetic force of the second driving magnetic element 312, so that a stronger driving force may be used to move the photosensitive element holder 23 along the first axis AX1 or to move (rotate) around the optical axis OA.

Figure 10:
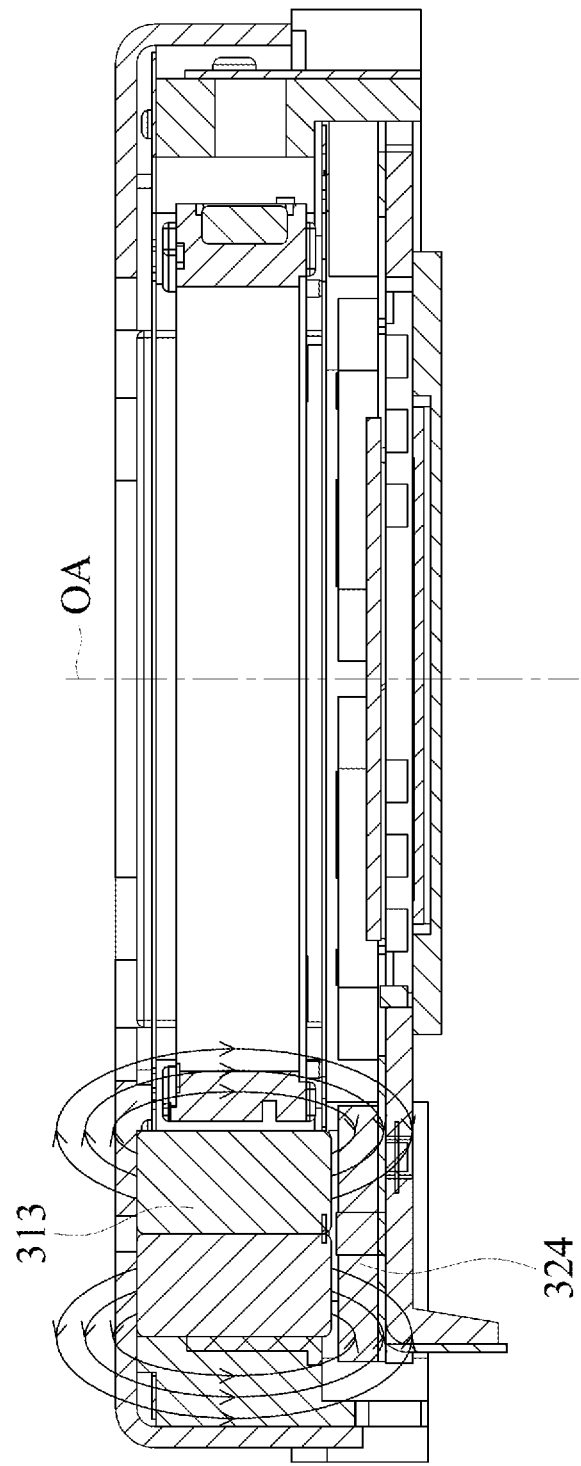
FIG. 10 is a cross-sectional view of the optical element driving mechanism along line F-F' of FIG. 2, wherein magnetic field lines of a third driving magnetic element are illustrated.

Please refer to FIG. 10, FIG. 10 is a cross-sectional view of the optical element driving mechanism 100 along line F-F' of FIG. 2, wherein the magnetic field lines of the third driving magnetic element 313 are illustrated.

It should be noted that, in FIG. 10, the lines with arrows represent magnetic field lines of the third driving magnetic element 313, wherein the directions of the magnetic field lines shown in FIG. 10 (as indicated by arrows) is only an example, which is not for limiting the embodiments of the present disclosure.

As shown in FIG. 10, according to some embodiments of the present disclosure, the magnetic force emitting surface (perpendicular to the magnetic field lines) of the third driving magnetic element 313 may be perpendicular to the optical axis OA. Thus, the photosensitive element holder third driving coil 324 may receive more magnetic force of the third driving magnetic element 313, and a stronger driving force may be used to move the photosensitive element holder 23 along the second axis AX2.

Figure 11:
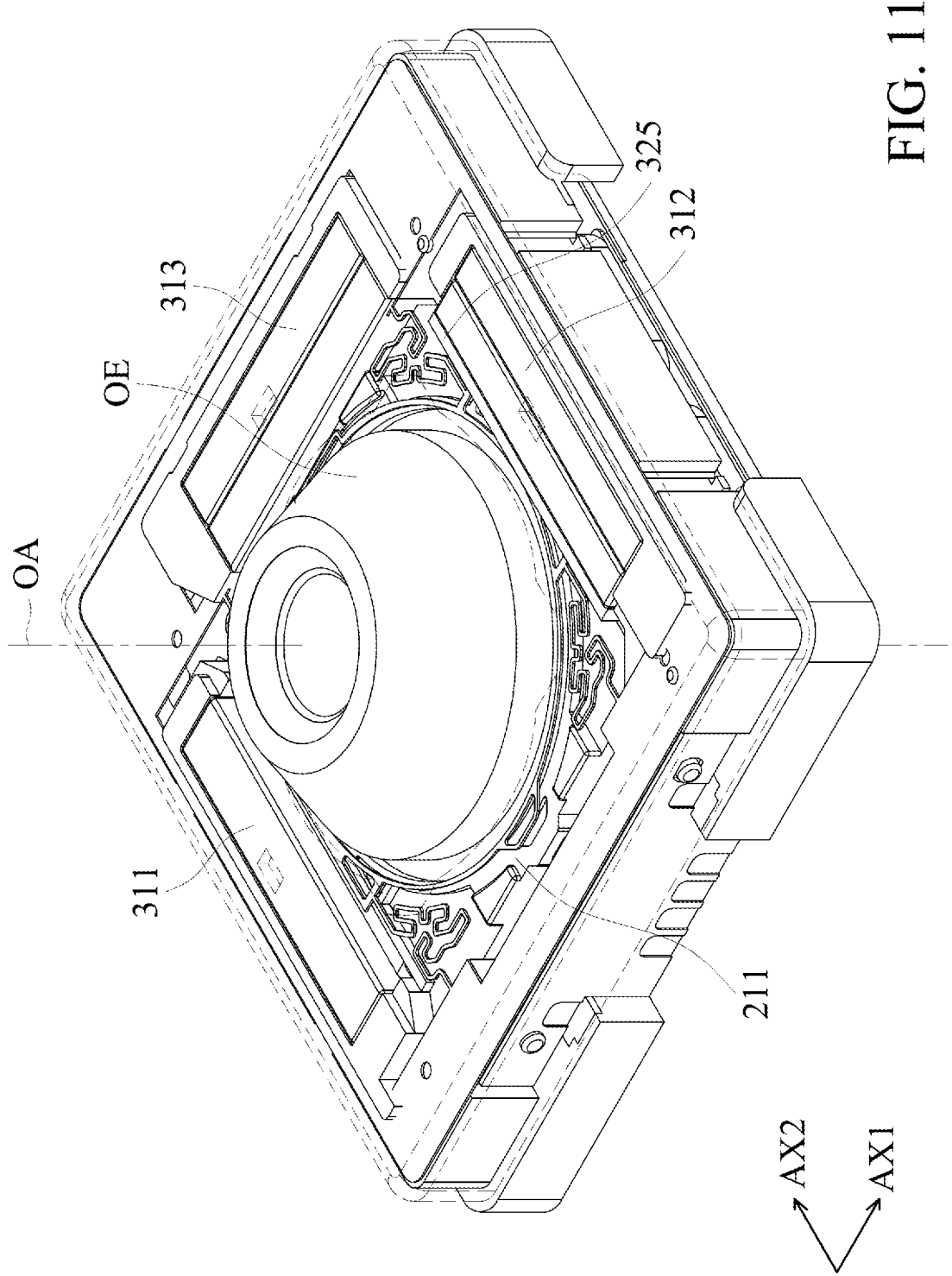
FIG. 11 is a schematic view of an optical element driving mechanism according to some other embodiments of the present disclosure, wherein the outer frame is shown as a dashed line.

Please refer to FIG. 11, FIG. 11 is a schematic view of an optical element driving mechanism 200 according to some other embodiments of the present disclosure, wherein the outer frame is shown as a dashed line. The main elements and the configuration of the optical element driving mechanism 200 is similar to the main elements and the configuration of optical element driving mechanism 100, and the similar parts will not be repeated.

As shown in FIG. 11, the main difference between the optical element driving mechanism 200 and the optical element driving mechanism 100 is that the driving coil 32 of the driving assembly 30 of the optical element driving mechanism 200 may further include an optical element holder second driving coil 325.

According to some embodiments of the present disclosure, the optical element holder second driving coil 32 may be disposed on the optical element holder 21, and the optical element holder second driving coil 32 may correspond to the second magnetic driving element 312.

In this way, a stronger driving force may be used to move the optical element holder 21 along the optical axis OA.

According to some embodiments of the present disclosure, the photosensitive element holder 23 of the movable part 20 of the optical element driving mechanism 100 and the optical element driving mechanism 200 may not include the photosensitive element holder rolling element accommodating portion 232. Instead, the frame 12 of the fixed part 10 may include a photosensitive element holder rolling element accommodating portion (not shown in the drawings). Similarly, the photosensitive element holder rolling element accommodating portion (not shown in the figure) of the frame 12 may surround the photosensitive element holder rolling element 24 (not shown in FIG. 11) to limit the range of movement of the photosensitive element holder rolling element 24.

In general, the optical element driving mechanism of the embodiment of the present disclosure may drive the optical element holder to move along the optical axis by using a single driving magnetic element, and it may drive the photosensitive element holder to move along a direction that is perpendicular to the optical axis or to move (rotate) around the optical axis by using the same driving magnetic element. Furthermore, the optical element driving mechanism of the embodiment of the present disclosure may have an eccentric driving assembly, an eccentric optical element holder, and an eccentric optical element. Therefore, the volume and weight of the optical element driving mechanism may be reduced, and the effect of miniaturization may be achieved.

Furthermore, the optical element driving mechanism of the embodiment of the present disclosure may use magnetic force to return the photosensitive element holder to the original position by using the photosensitive element holder metal sheet. The optical element driving mechanism of the embodiment of the present disclosure may also electrically connect the elements of the optical element driving mechanism to an external circuit through the frame metal sheet. Moreover, the configuration of the magnetic force emitting surface of the driving magnetic element of the optical element driving mechanism of the embodiment of the present disclosure may be helpful for driving the optical element holder. Therefore, the volume and weight of the optical element driving mechanism may be reduced, and the effect of miniaturization may be achieved.

Although embodiments of the present disclosure and their advantages have been described in detail, it should be understood that various changes, substitutions and alterations may be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, the scope of the present disclosure is defined by the scope of the appended claims. In addition, each scope of the claims is constructed as a separate embodiment, and various combinations of the claims and combinations of embodiments are within the scope of the present disclosure.

What is claimed is:

1. An optical element driving mechanism, comprising:
    a fixed part;
    a movable part, movable relative to the fixed part;
    a driving assembly, driving the movable part to move relative to the fixed part; and
    a circuit assembly, comprising a photosensitive element holder circuit board,
    wherein the movable part comprises a photosensitive element holder, and the photosensitive element holder comprises a photosensitive element holder metal sheet,
    wherein the driving assembly comprises a driving magnetic element,
    wherein the photosensitive element holder metal sheet at least partially overlaps the driving magnetic element when viewed along an optical axis,
    wherein the driving assembly further comprises a driving coil, and the driving coil is disposed between the driving magnetic element and the photosensitive element holder metal sheet,
    wherein the photosensitive element holder circuit board is disposed between the driving coil and the photosensitive element holder metal sheet.

2. The optical element driving mechanism as claimed in claim 1, wherein the driving assembly center of the driving assembly does not overlap an optical element driving mechanism center of the optical element driving mechanism when viewed along an optical axis.

3. The optical element driving mechanism as claimed in claim 1, wherein the movable part holds an optical element,
    wherein an optical element center of the optical element does not overlap the optical element driving mechanism center of the optical element driving mechanism when viewed along an optical axis.

4. The optical element driving mechanism as claimed in claim 1, wherein the photosensitive element holder metal sheet does not completely overlap the whole driving magnetic element when viewed along the optical axis.

5. The optical element driving mechanism as claimed in claim 1, wherein there is a non-zero gap between the photosensitive element holder metal sheet and the driving magnetic element.

6. The optical element driving mechanism as claimed in claim 1, wherein there is a non-zero gap between the photosensitive element holder metal sheet and the driving coil.

7. The optical element driving mechanism as claimed in claim 1, wherein the photosensitive element holder circuit board is in contact with the photosensitive element holder metal sheet.

8. The optical element driving mechanism as claimed in claim 1, wherein the fixed part comprises a frame, and the movable part comprises a photosensitive element holder rolling element,
    wherein the photosensitive element holder rolling element is disposed between the frame and the photosensitive element holder.

9. The optical element driving mechanism as claimed in claim 8, wherein the photosensitive element holder comprises a photosensitive element holder rolling element accommodating portion,
    wherein the photosensitive element holder rolling element accommodating portion surrounds the photosensitive element holder rolling element,
    wherein the photosensitive element holder metal sheet at least partially overlaps the photosensitive element holder rolling element accommodating portion when viewed along a direction that is perpendicular to the optical axis.

10. The optical element driving mechanism as claimed in claim 8, wherein the frame comprises a photosensitive element holder rolling element accommodating portion,
    wherein the photosensitive element holder rolling element accommodating portion surrounds the photosensitive element holder rolling element.

11. The optical element driving mechanism as claimed in claim 8, wherein the frame comprises a frame metal sheet,
    wherein the photosensitive element holder rolling element is disposed between the frame metal sheet and the photosensitive element holder metal sheet.

12. The optical element driving mechanism as claimed in claim 11, wherein the photosensitive element holder rolling element is in contact with the frame metal sheet and the photosensitive element holder metal sheet.

13. The optical element driving mechanism as claimed in claim 11, further comprising an elastic assembly,
    wherein the elastic assembly comprises a lower elastic element, and the lower elastic element is disposed under the frame metal sheet.

14. The optical element driving mechanism as claimed in claim 13, wherein the lower elastic element is in contact with the frame metal sheet, and the photosensitive element holder rolling element does not have a metal material.

15. The optical element driving mechanism as claimed in claim 14, further comprising a circuit assembly, and the circuit assembly comprises an optical element holder circuit board,
    wherein an external current flows into the optical element driving mechanism from the optical element holder circuit board, and then flows into the frame metal sheet, the lower elastic element, and the driving assembly in sequence.

16. The optical element driving mechanism as claimed in claim 1, further comprising an elastic assembly,
    wherein the fixed part comprises an outer frame and a frame, and the outer frame has a magnetic conductive material,
    wherein the elastic element comprises an upper elastic element, and the upper elastic element is disposed above the frame,
    wherein the elastic assembly is disposed between the driving assembly and the outer frame.

17. The optical element driving mechanism as claimed in claim 16, wherein the movable part comprises an optical element holder and a photosensitive element holder, and the optical element holder comprises an optical element holder body and an optical element holder stopping element,
    wherein along the optical axis OA, the shortest distance between the stopping element of the optical element holder stopping element and the frame is shorter than the shortest distance between the optical element holder body and the photosensitive element holder.

\* \* \* \* \*